Patented Aug. 4, 1936

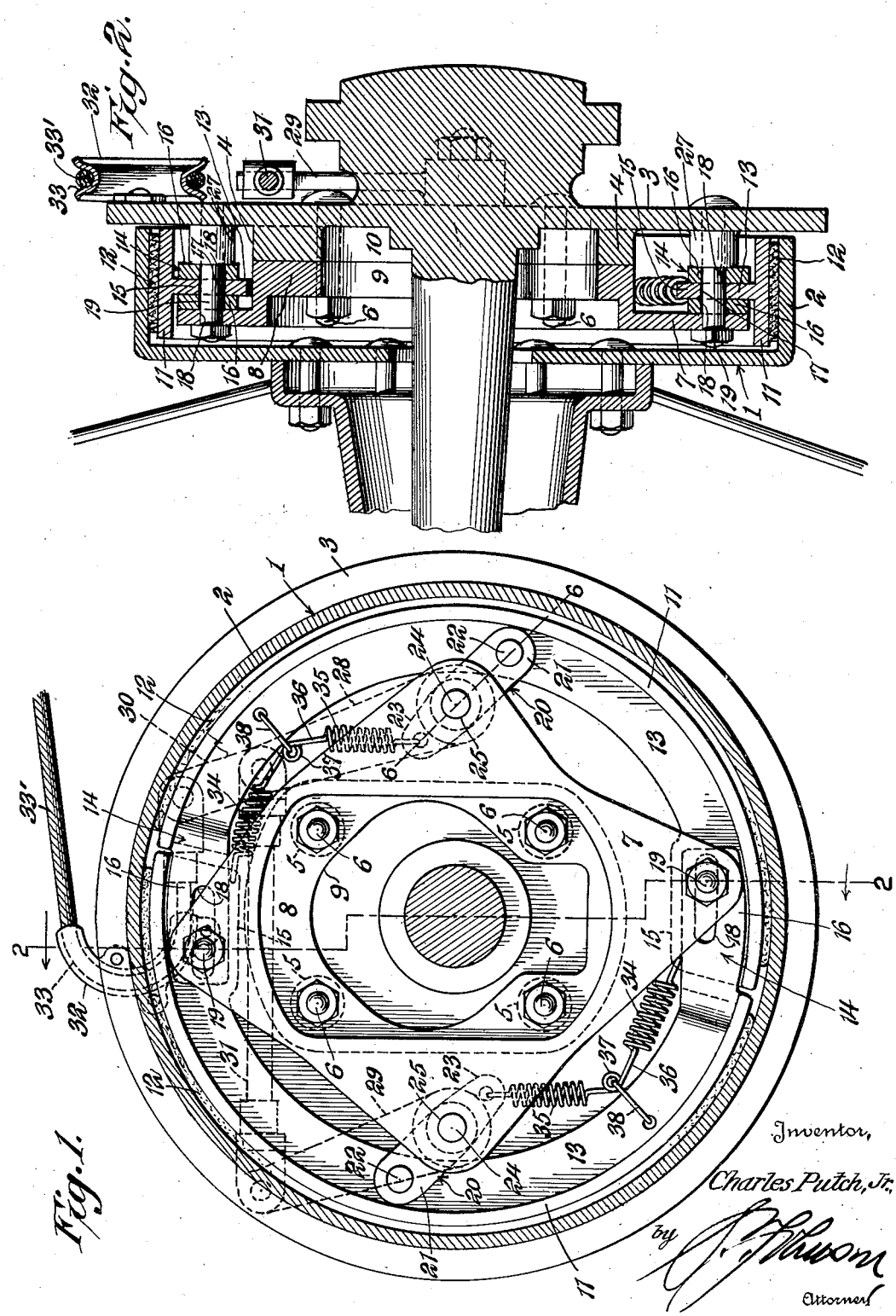

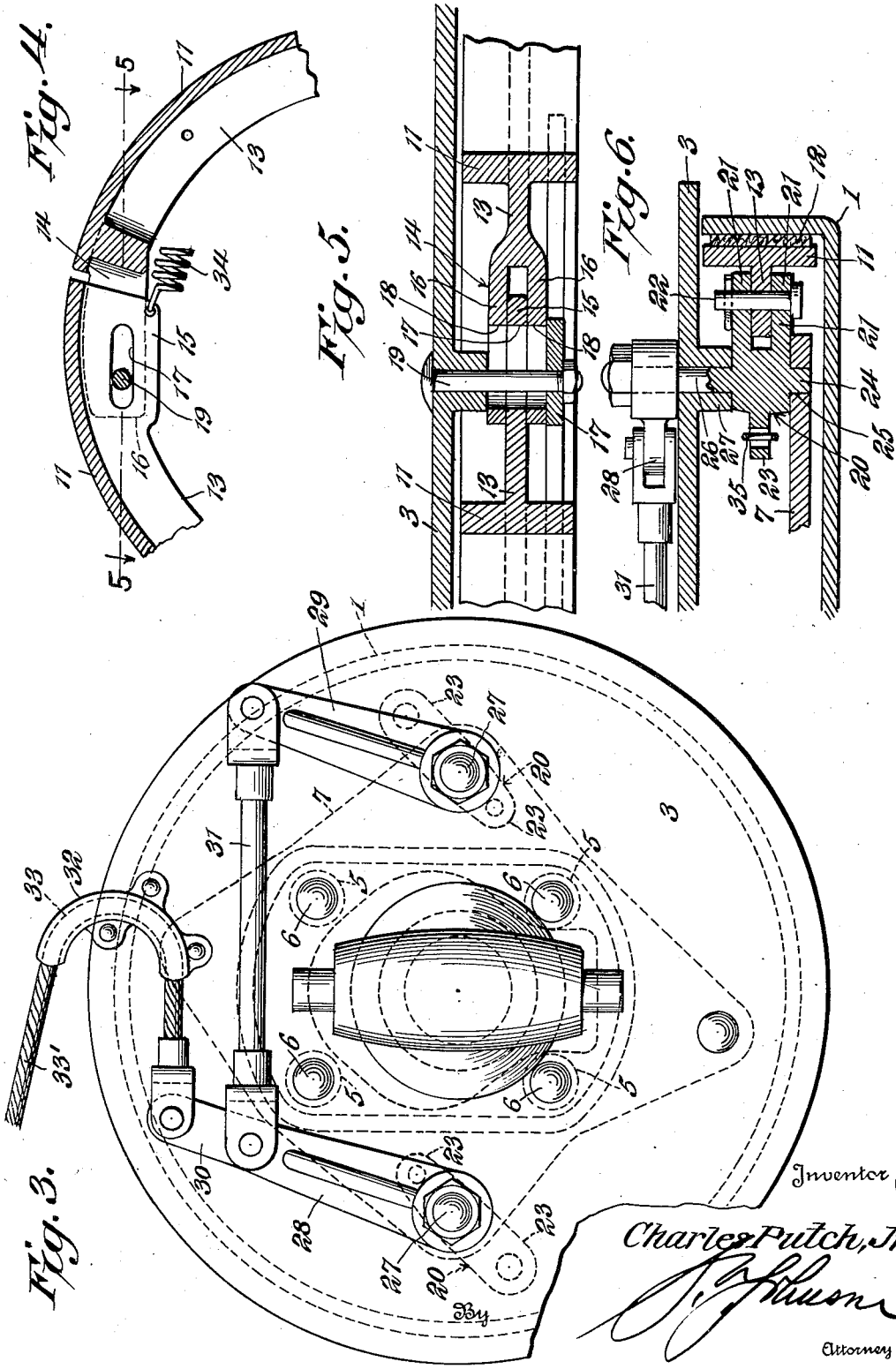

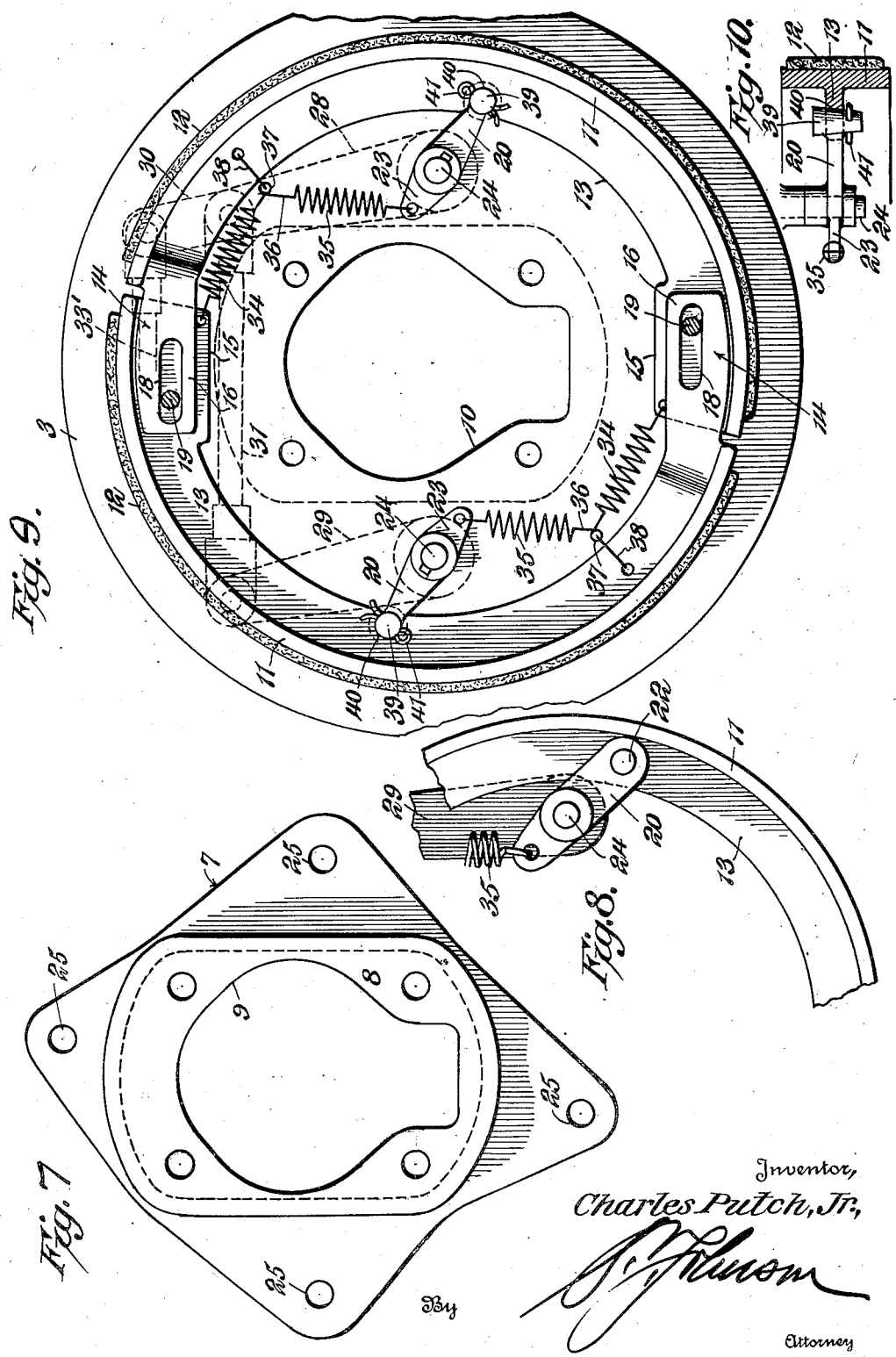

2,050,121

UNITED STATES PATENT OFFICE 2,050,121

BRAKE

Charles Putch, Jr., Texarkana, Tex.

Application August 1, 1935, Serial No. 34,274

4 Claims. (Cl. 188—78)

The present invention is directed to improvements in brakes, and more particularly to that type used in connection with motor vehicle wheels.

The primary object of the invention is to provide a device of this kind so constructed that the brake shoes are manipulated in a manner to frictionally engage the brake drum with an even pressure, there being novel means for expanding the brake shoes for engagement with the drum.

Another object of the invention is to provide a device of this character which consists of a minimum number of parts assembled in a simple, but novel manner for effective operation.

Another object of the invention is to provide a brake of this kind which is durable, and can be manufactured at a small cost.

With these and other objects in view, this invention resides in the novel features of construction, formation, combination and arrangement of parts to be hereinafter more fully described, claimed and illustrated in the accompanying drawings, in which:

Figure 1 is a front elevation.

Figure 2 is a sectional view on line 2—2 of Fig. 1.

Figure 3 is a rear view.

Figure 4 is a detail view, partly in section of the meeting ends of a pair of brake shoes.

Figure 5 is a sectional view on line 5—5 of Fig. 4.

Figure 6 is a sectional view on line 6—6 of Fig. 1.

Figure 7 is a rear view of the cover plate.

Figure 8 is a detail view of one of the thrust arms.

Figure 9 is a front elevation showing a modified form of thrust arm connection.

Figure 10 is a detail, partly in section of the thrust arm connection.

Referring to the drawings, 1 designates the brake drum having the usual rim 2, which is as customary rotatable relative to the base plate 3. The outer face of the plate 3 is formed with a wall 4 and bosses 5, clamping bolts 6 being passable through the latter. A cover plate 7, of spider-like form, is provided and has its inner face formed with a wall 8 having a key-hole shaped opening 9 therein, which co-incides with the similar shaped recess 10 in the base plate 3.

The wall 8 of the plate 7 is held with its inner face in intimate clamped engagement with the wall 4 by the bolts 6, as clearly shown in Fig. 2 of the drawings.

Confined within the drum 1 are the arcuate shaped brake shoes 11, two of which are shown, but it will be understood that the number may be increased if desired. The shoes are equipped with the usual brake linings 12.

The shoes are T-shaped in cross section, the webs 13 formed with forks 14 and tongues 15, the tongues being slidably fitted between the 10 arms 16 of said forks. The tongues 15 and arms 16 are provided with aligned slots 17 and 18, respectively, and through which the studs 19 are passed in order that the opposed ends of the brake shoes will be connected for free sliding movement and will be evenly guided in their movement during operation.

To actuate the brake shoes for engagement or disengagement with the brake drum each brake shoe has associated therewith a thrust arm 20, the outer ends of which are provided with furcations 21 between which webs 13 of the shoes are engaged, and pivoted thereto by pins 22.

The arms 20 are further provided with extensions 23, the purpose of which will later appear.

Each thrust arm 20 has formed integral therewith a trunnion 24 which is journaled in a bearing 25 in the plate 7, said arm also having formed integral therewith a relatively long trunnion 26 adapted to be journaled in a boss 27 on the outer face of the base plate 3, as more clearly shown in Fig. 6 of the drawings.

To the inner ends of the trunnions 26 are fixed the lower ends of the levers 28 and 29, the former being somewhat longer than the latter to provide an extension 30. The levers are connected by a link 31 in order that the thrust arms will be simultaneously actuated upon rocking the levers to impart movement to the brake shoes 11 in a manner to be hereinafter described.

Fixed to the cover plate 3 is an arcuate guide 32 formed with a groove 33 in which is guided a cable 33' which leads to the brake pedal, not shown.

The tongues 15 of the shoes 11 are connected to the extensions 23 of the thrust arms 20 by spring structures consisting of single lengths of spring wire having a pair of coils 34 and 35, the outer terminals of which are suitably secured, respectively, to the tongues and extensions.

The sections of wire between the springs 34 and 35 are bent to provide eyes 37, there being links 38 connecting the sections 36 to the webs 13 of the brake shoes to maintain the coils 34 and 35 in angular relationship in order that the spring structures will be held in positions to avoid interference with the adjacent parts of the brake assembly, but at the same time the tension thereof will assure effective operation of the shoes.

It will be observed that the outer ends of the thrust arms have their outer ends pivotally connected with the brake shoes at central points in order that the shoes will have imparted thereto strain to assure even engagement with the drum.

In the modified form of the invention as shown in Figures 9 and 10, the thrust arms 20 have their outer ends provided with integral heads 39 disposed at right angles to said arms, said heads being tapered longitudinally and are adapted to be slid endwise into the tapered notches 40 formed in the webs of the brake shoes. Owing to the tapered formation of the heads 39 the minor ends thereof can enter the notches 40, but cannot pass therethrough owing to this tapered formation. Cotter pins 41 are passed through the minor ends of the heads 39 after the same are properly engaged in the notches. In this manner a pivotal connection for the outer end of each thrust arm is provided without the use of pivot pins, such as pins 22 in the preferred form of the invention.

Briefly the operation is as follows:

When the cable 33' is pulled upon actuation of the brake pedal, not shown, the levers 28 and 29 are simultaneously rocked due to the connecting link 31, which action rocks the arms 20 in a direction to expand or move outwardly the brake shoes 11, and at which time the springs 34 and 35 are placed under tension. When the cable is released the springs will contract and move the shoes inwardly or toward each other and move the shoes from engagement with the brake drum.

Since the trunnions of the thrust arms are disposed in horizontal alinement and the pivotal connection 22 with the drums are non-alined the brake shoes will have imparted thereto slight curvilinear movement when the arms are rocked to insure an even engagement of the shoes with the drum.

What is claimed is:

1. In a vehicle wheel brake, a drum, brake shoes confined within the drums and having their opposed ends slidably interfitted, pivotally mounted thrust arms, each having one end pivotally connected with a brake shoe and its other end provided with an extension, springs connecting the extension of one arm with the end of the opposed brake shoe, means connecting the springs intermediate their terminals with the brake shoes, levers fixed to the thrust arms, and means connecting the thrust arms to rock the same in opposition to the tension of the springs to expand the shoes for engagement with the drum.

2. In a vehicle wheel brake, a drum, including a base plate, opposed brake shoes confined within the drum, each shoe having a tongue on one end and a fork on the other end, the tongue of one shoe being slidable between the arms of the fork of the other shoe, the tongues and arms being provided with coinciding slots, studs carried by the base plate for slidable engagement in said slots, pivotally mounted thrust arms, each having one end pivotally connected with one shoe and having an extension on the other end, a spring connecting each extension with the tongue of each shoe to normally hold the shoes contracted, and means for rocking the thrust arms simultaneously to expand the brake shoes to engage the drum.

3. In a vehicle wheel brake, a base plate having a recessed wall on its outer face, a cover plate having a wall on its inner face and provided with an opening adapted to coincide with said recess, bolts passable through the base plate and cover plate to hold the respective walls in intimate clamped engagement, brake shoes confined within the drum, a thrust arm for each shoe having trunnions thereon journaled in the base plate and cover plate, said arms having one of their arms pivotally connected with a brake shoe, means for connecting resiliently the thrust arm of one shoe with the end of the opposed shoe, and means for simultaneously rocking the thrust arms to expand the brake shoes in opposition to the resilient connections.

4. In a vehicle brake, a drum, brake shoes confined within the drum for engagement with the rim thereof, the brake shoes having tapered notches formed therein, pivotally mounted thrust arms connected with the brake shoes, said thrust arms having tapered heads thereon for pivotal engagement in said notches, means for simultaneously rocking the thrust arms to actuate the brake shoes for engagement with the drum, and resilient means connecting the brake shoes and thrust arms to withdraw the brake shoes from engagement with the drum.

CHARLES PUTCH, Jr.